US005893603A

United States Patent [19]

Viertel et al.

[11] Patent Number: 5,893,603

[45] Date of Patent: Apr. 13, 1999

[54] ROOF LINER FOR MOTOR VEHICLES

[75] Inventors: Lothar Viertel, Altforweiler, Germany; Patrick Welter, La Chambre, France

[73] Assignee: Becker Group Europe, GmbH, Germany

[21] Appl. No.: 08/713,136

[22] Filed: Sep. 16, 1996

[30] Foreign Application Priority Data

Oct. 5, 1995 [DE] Germany .......................... 195 37 081

[51] Int. Cl.[6] .......................... B60J 7/00

[52] U.S. Cl. .......................... 296/214; 296/220.01

[58] Field of Search .......................... 296/214, 215, 296/219, 220.01

[56] References Cited

U.S. PATENT DOCUMENTS

| | | | |
|---|---|---|---|
| 1,860,463 | 5/1932 | Kaplan et al. | 296/219 |
| 3,658,378 | 4/1972 | Sutren | 296/219 |
| 4,274,672 | 6/1981 | Kuroda | 296/220 |
| 4,923,244 | 5/1990 | Clenet | 296/214 |
| 4,964,668 | 10/1990 | Hofmann . | |
| 5,671,969 | 9/1997 | Sutor et al. | 296/214 |

FOREIGN PATENT DOCUMENTS

| | | |
|---|---|---|
| 0356639 B1 | 6/1994 | European Pat. Off. . |
| 1 124 226 | 10/1956 | France . |
| 1 939 005 | 5/1966 | Germany . |
| 1 944 652 | 8/1966 | Germany . |
| 1 954 295 | 1/1967 | Germany . |
| 3 504 570 A1 | 8/1986 | Germany . |
| 8 708 269 U1 | 9/1987 | Germany . |
| 4 111 931 C1 | 5/1992 | Germany . |
| 4 127 387 C2 | 9/1992 | Germany . |
| 2 202 806 | 10/1988 | United Kingdom . |
| WO 90/00986 | 2/1990 | WIPO . |

OTHER PUBLICATIONS

German Search Report dated Feb. 5, 1996.

*Primary Examiner*—Joseph D. Pape
*Attorney, Agent, or Firm*—Harness, Dickey & Pierce, P.L.C.

[57] ABSTRACT

A roof liner having a flexible lining material which extends both longitudinally and transversely across the vehicle. To enable the roof liner to be a sliding, folding liner, a plurality of bows extend across the lining material at spaced intervals from the front to the rear, uniformly spaced distances. Guide elements engage alternate pairs of bows providing a tension panel between the two bows engaged by the guide element and an untensioned panel between two guide elements. A respective guide rail at the side of the roof receives each of the guide elements for sliding therealong. The respective guide element receiving rails are stacked one above the other and parallel, enabling each guide to move over the full longitudinal length of its path.

24 Claims, 5 Drawing Sheets

Fig-6
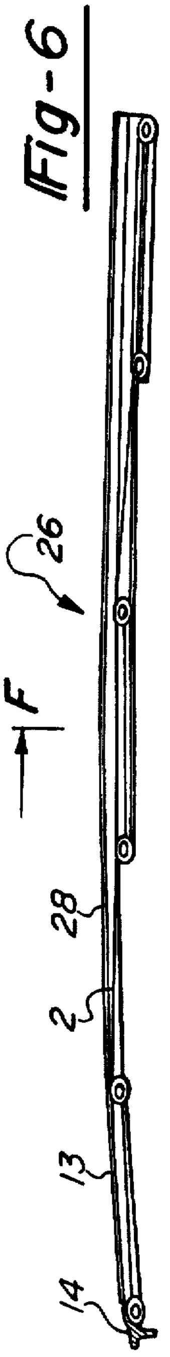
Fig-7
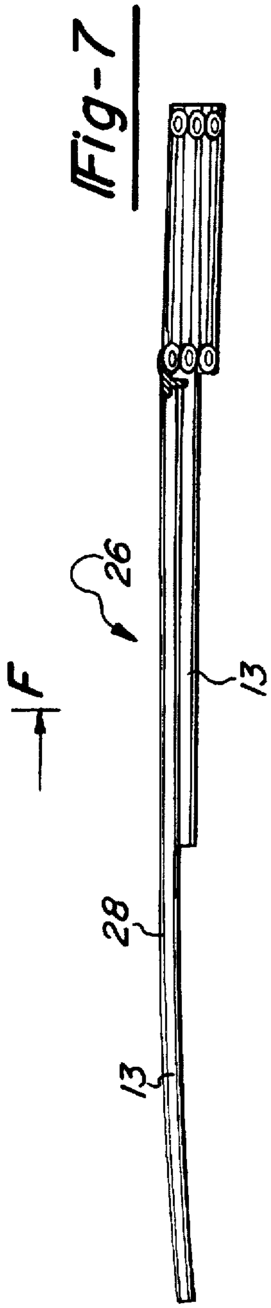
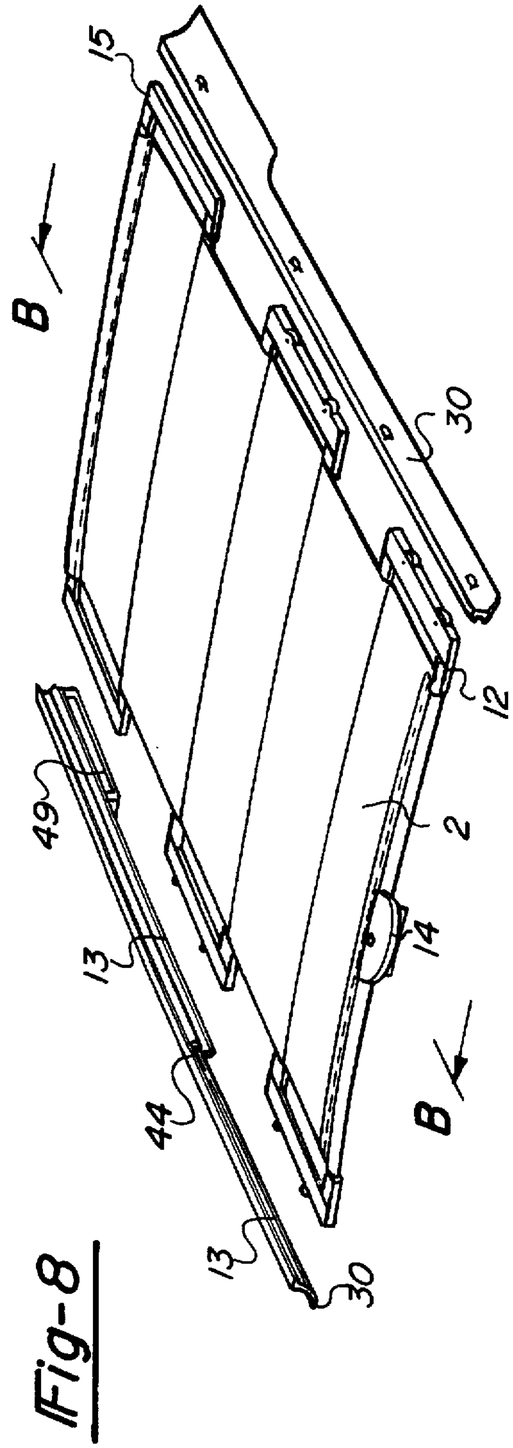
Fig-8

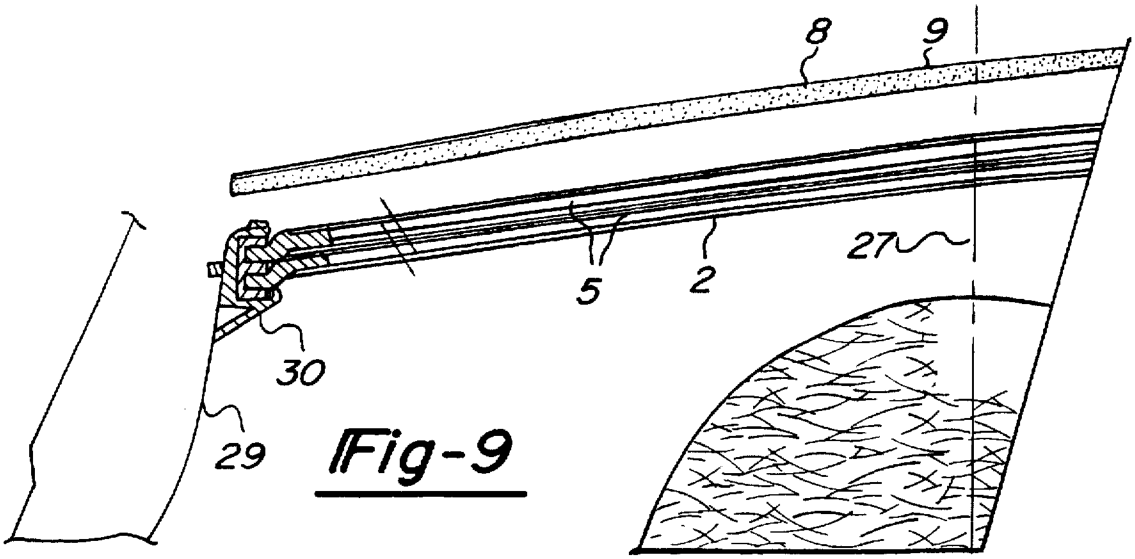
Fig-9
Fig-10
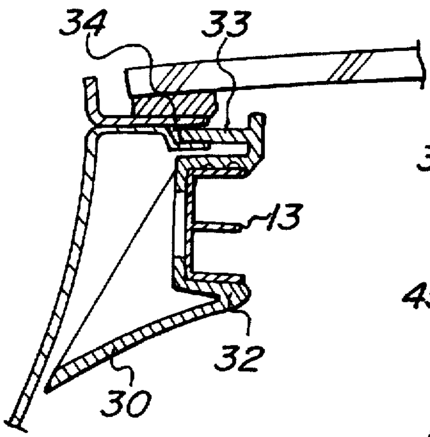
Fig-10a
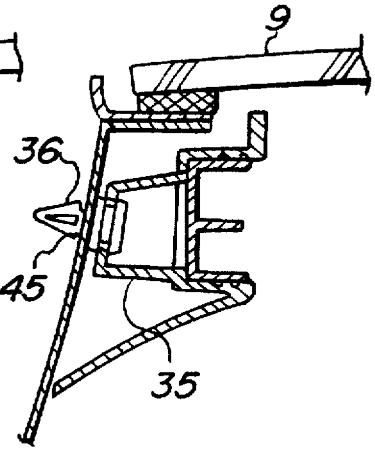
Fig-11
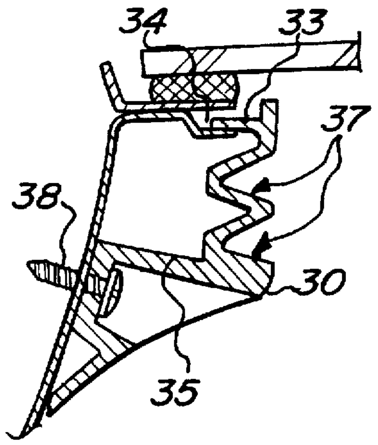
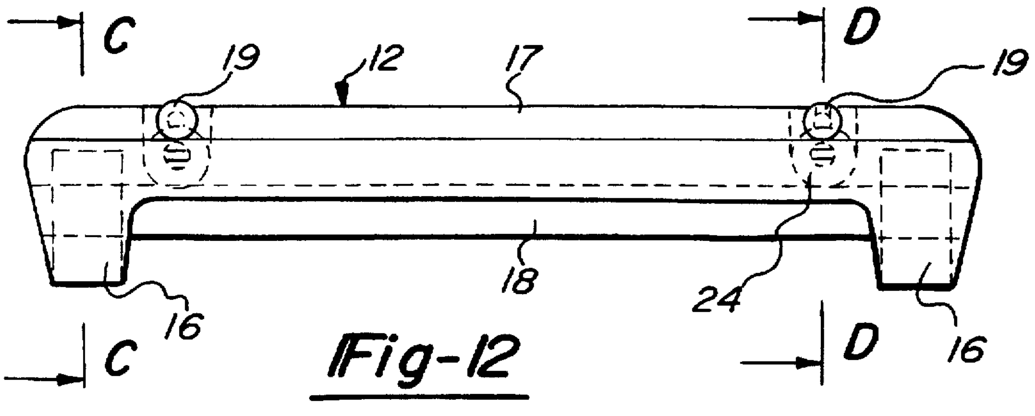
Fig-12

ROOF LINER FOR MOTOR VEHICLES

BACKGROUND OF THE INVENTION

The present invention relates to a roof liner for motor vehicles having a lining material which extends in the longitudinal and transverse directions of the vehicle. The invention particularly concerns the sliding and folding support for the lining material.

Slidable flexible roof liners are known. But the mode of guiding them to fold up has certain drawbacks which the present invention addresses.

SUMMARY OF THE INVENTION

The object of the invention is to develop a roof liner as a sliding and folding liner to enable exposing or covering a region of the roof, which contains, for instance, a pane of glass. The sliding roof liner may provide an insulating effect delaying heating up of the inside of the vehicle in the sun or radiating out of heat in winter. In its open or folded together condition, the sliding folding liner should have the effect of a convertible top and permit the passage of air and light through the vehicle.

In order to achieve these objects, the vehicle roof liner of the invention is provided with a lining material which extends in the longitudinal and transverse direction of the vehicle. Bows, that is transversely extending bars, are fastened to the lining material and support at least the front and rear longitudinal ends of the lining material and may provide support at intervals between those ends, particularly at equal distances apart. There are guide elements on the opposite ends of the bows, outward of the sides of the lining material. Guide means, e.g., in the form of rails, are fastened to the body of the car and extend approximately parallel to the edges of the roof of the vehicle. They receive the guide elements in a longitudinally displaceable manner.

Pushing the bows together can in a simple manner expose a region in the roof surface. The flexible lining material present between the bows collapses into folds which hang downward. Increasing the number of bows increases their frequency along the roof and as a result reduces the size of the folds and reduces the amount by which the folds might hang down, which may be important for head clearance inside the vehicle. Pulling the bows apart tensions the liner between the bows. The stretched length is such that the roof region in question is also covered. The bows can be displaced from front to rear and/or from rear to front.

In a preferred embodiment of the invention, the roof liner is provided with guide elements, which are developed as slides, and which rigidly connect together the first and second, the third and fourth, the fifth and sixth, and, if present, the seventh and eighth bows. The roof liner also has separate guide means for each slide. There are no guide elements between the second and third, fourth and fifth or sixth and seventh bows, i.e., alternate bows. Tensioned covering panels are defined between each two bows supported and joined by a guide element and untensioned panels are defined between each two bows not joined by a guide element. As a result, the lining material, both in its stretched out and its folded conditions, should no longer have any downward hanging folds, providing greater head clearance. The lining material or the regions present between the individual bows rather extend parallel to the roof of the vehicle to which they can furthermore be relatively closely adjacent. Only the folding together of the sliding folding liner provides a certain downward hanging of the regions of the liner which lie between the second and third or the fourth and fifth bows, i.e., the lining material panels not joined by a guide element.

The guide means preferably are comprised of rails aligned parallel and also vertically one above the other and of a slide guided in each rail. This enables easy manufacture and assembly.

The bows divide the lining material into tensioned and untensioned panels which can be arranged optionally alongside of each other or one above the other in order to substantially cover or expose the roof of the vehicle. This also permits, for instance, opening of the sliding folding liner half way without causing downward hanging folds.

In another embodiment of the invention, the rearmost slide in the longitudinal direction of the vehicle is fixed in position. A respective rail of a length corresponding to the respective path of displacement of each slide is associated with each displaceable slide to define the guide means for that slide. The sliding folding liner can thus be opened and closed as also desired by the driver only from the front seats of the car. Graduating the lengths of the rails for the length of the travel path of each guide promotes good appearance and also helps to save material.

To achieve the desired head clearance, the bows further are arcuately developed adapted to the transverse curvature of the roof of the car. Furthermore, the bows are non-circular in cross section, for instance they are oval, to prevent their simply rotating in their correspondingly non-circular slide receivers.

In the same way that the bows are adapted to the transverse curvature of the roof of the car, the rails are also adapted to the longitudinal curvature of the roof of the car.

In order to minimize the hanging down of the untensioned lining material panels during the closing movement of the lining material, the edges of the untensioned panels engage from above over the corresponding adjoining bow.

The loops formed in the lining material for receiving the bows can be produced separately and can then be sewn or welded onto the lining material. Preferably, however, the loops are developed integrally with the lining material by welded or sewn seams.

In order to obtain easy operation of the sliding folding liner, the slides can be developed with slide surfaces and/or rollers which are guided in their respective rails. In a further development of the invention, it is advantageous if each of the slides has a displacement device which can bring the slide surfaces and/or rolls against the rails to compensate for tolerances. The displacement device may be spring means or an eccentric disk which acts against its slide.

For good appearance of the roof liner, it is advisable to arrange the rails on a masking element which can be fastened to the body of the car. It is also advantageous to develop the rails in one piece with, and of the same material as, that masking element. The masking element may suitably comprise a part produced by injection molding.

For opening and closing the sliding folding liner toward and away from the rear, it is advisable to arrange an actuating handle on the bow that is arranged furthest to the front.

Other features and advantages of the present invention will become apparent from the following description of the invention which refers to the accompanying drawings.

BRIEF DESCRIPTION OF THE DRAWINGS

One embodiment of the invention will be explained in further detail below with reference to the drawing, in which:

FIG. 6 shows the roof liner in an unfolded condition, approximately along the line B—B of FIG. 8;

FIG. 7 shows the roof liner of FIG. 6 in a folded condition;

FIG. 8 is an exploded view of the roof liner with guide means;

FIG. 9 is a cross section, approximately along the line F—F of FIG. 6;

FIGS. 10, 10*a*, and 11 show arrangements for the attachment of masking elements having guide means;

FIG. 12 shows a guide element developed as a slide;

DETAILED DESCRIPTION OF EMBODIMENTS OF THE INVENTION

Figure 1:
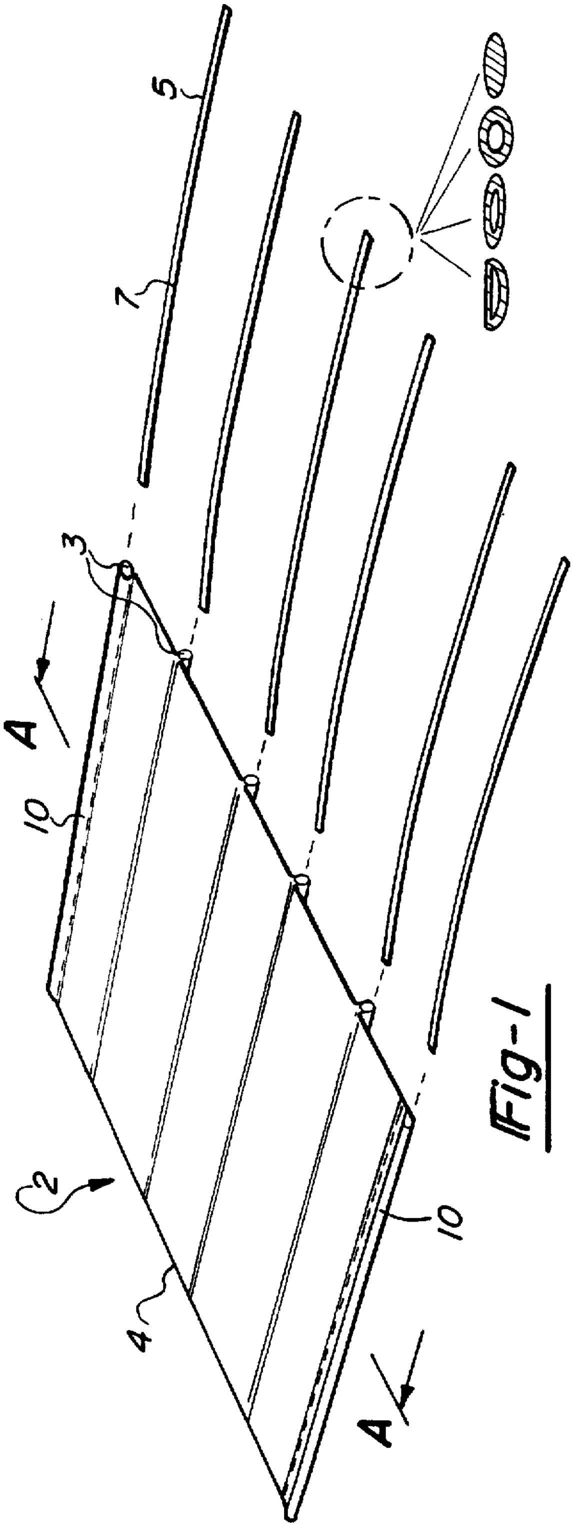
FIG. 1 is an exploded view of the lining material having loops for the bows sewn or welded thereon and showing the bows.

The roof liner or sliding folding liner 1 of the invention is comprised of a lining material 2, several bows 5, guide elements in the form of slides 12 and 15 arranged on the ends of the bows, guide means developed as rails 13, and masking elements 30 to be fastened to the body 29 of a vehicle.

The lining material 2 may be comprised of a flexible or at least foldable, perforated material such as a polyester knitted fabric, a flat textile, a foil, a canvas material, or the like, selected to the customers' request with respect to the passage of light and its color.

The lining material 2 of FIG. 1 receives its first shaping by a corresponding blank which is then further shaped by sewing or welding, depending on the material selected. In the embodiment shown, six loops 3 are formed in the lining material by seams 10 which are formed to extend in the transverse direction, as shown in FIG. 1. Similarly, the two lateral outer edges 4 in the lengthwise direction of the lining material can be welded off or sealed off.

For functional reasons and reasons of strength, the shaping bows 5 or bars are preferably made from aluminum extrusions, and are preferably of oval shape. The bows 5 can, however, also be made of suitable extruded plastics. The bows 5 are identical in shape and size. Their lengths correspond to the predetermined curvature of the roof 8, for instance a glass roof 9, and they are curved, as at 7. The surfaces of the bows can be anodized or powder coated, if desired, to adapt their color to other parts of the interior. Each bow 5 is pushed into a loop 3 that was formed in the lining. At the lateral outer edges 4 of the lining material 2, the bows protrude a uniform distance. The seams 10, as shown in FIGS. 2 and 3, are positioned to correspond to the individual bows 5, producing same size panels 11 of the lining material 2 between neighboring bows 5.

Figure 2:
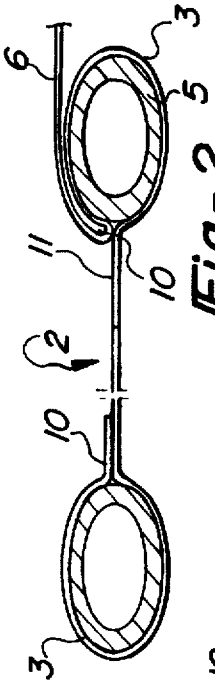
FIG. 2 is an enlarged showing of the circled region X of FIG. 3.
Figure 3:
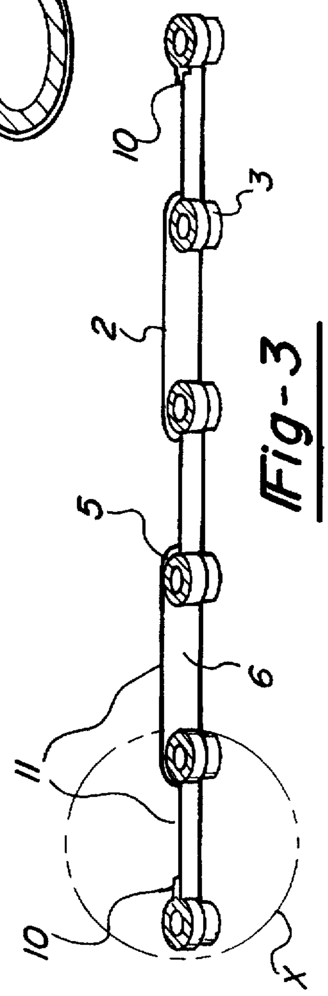
FIG. 3 is a cross section approximately along the line A—A in FIG. 1.

To assure the travel of the sliding folding liner 1 upon operation, it is necessary to arrange the seams 10, as shown in FIGS. 2 and 3, in combination with the vertically stepped arrangement of the rails 13, and therefore of the slides 12, as shown in FIGS. 6 and 7. This provides a harmonious, fold free, gathered effect upon opening the liner, as shown in FIG. 7. The same is true upon the closing, as shown in FIG. 6.

Figure 5:
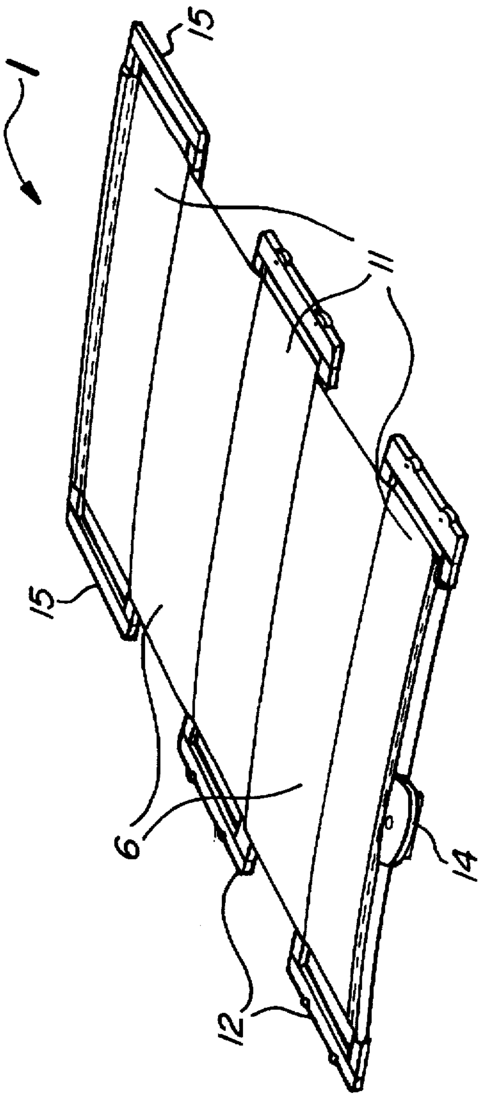
FIG. 5 shows the roof liner of FIG. 4, assembled.
Figure 4:
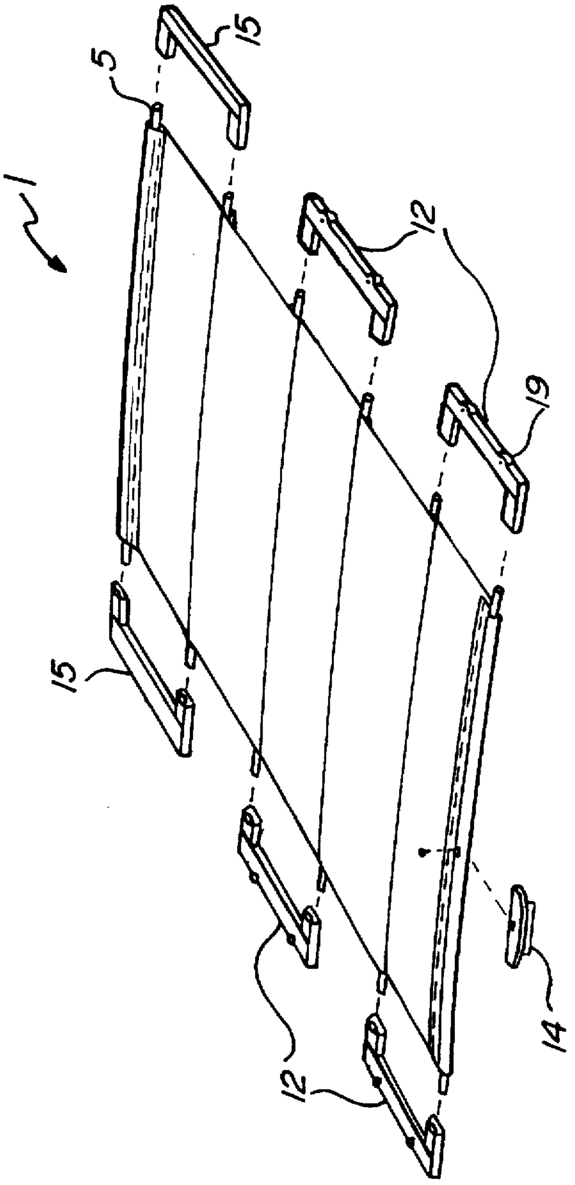
FIG. 4 is an exploded view of the lining material with bows installed, and, alongside thereof, guide elements to be arranged thereon.

The slides 12 are placed on the ends of the mounted bows 5. In each case, two bows 5 are connected together by a slide 12 while the next adjacent alternate bows are not connected. This divides the lining material 2 into tensioned panels 11 between the legs of a slide and alternate untensioned panels 6 not at a slide. The last or final slide 15 to the rear, as shown in FIGS. 4 and 5, serves merely for forming the frame, as mentioned above, and for the attachment of the sliding folding liner 1 since the latter is not moved.

An actuating grip is placed as an actuating handle 14 on the front bow 5 and is screwed thereon to secure it. The grip serves for opening and closing the sliding folding liner 1.

As can be seen in FIGS. 6–8, there is a respective guide means or rail 13 for each slide 12. Each rail for a further forward slide is vertically higher than the rail for the next slide to the rear, i.e., the stack of rails is stepped, with the higher steps longer front to rear than each step below it. Those rails are vertically stacked so that each slide moves along its respective rail without interfering with movement of the other slides. Each rail has a longitudinal or front to rear length selected for the desired path of movement, so that the slides further to the rear of the vehicle travel over a shorter path for example. Other arrangements for separating the rails may be envisioned.

As the liner is moved from its closed condition of FIG. 6, all of the slides travel rearward along their respective rails, the sequentially further forward slides moving on the sequentially higher rails, until those slides that have been moved rearward are stacked above each other. The slides move their respective tensioned panels to the rear, and because the rear of each slide moves to the rear end of its rail, the untensioned panels between two slides move into the space between two vertically neighboring rails, as can be seen in FIG. 7. As a result, the lining has no loose hanging panels.

The slides 12, 15 are plastic extrusions. Each slide 12, 15 has two hollow chambers 16 that are adapted to the respective bows 5. The slides 12 have lateral slide surfaces 17 which are adapted to the guide rails 13. In the lower longitudinal viewing region of the slide 12 a thin wall 18 is developed as an additional light screen, which can furthermore serve for the placing on of the outer edge 4 of the lining material 2.

In order to actuate the sliding folding liner 1 in a manner which is freer of friction and more easily slidable, each of the slides 12 has two rollers 19 with a journal 20 which are mounted centrally in a groove 21 in the slide 12. In order to compensate for transverse tolerances of the body of the car, the rollers 19 can be adjusted via spirally shaped plastic disks, i.e., eccentric disks 24. The adjustment is effected via a slotted hole 22, which can be done through the hole 23 in the slide 12 by means, for instance, of a screwdriver. The plastic disk 24 is turnably mounted in a pocket like recess 25 in the slide 12. In order to prevent its unintended displacement, the spiral disk 24 has uniformly distributed detents 41 on its circumference which engage on the elevation 42 that is provided in the pocket shaped recess 25. The possible adjustment is established and designed so that easy handling is possible in the installed condition of the sliding folding liner 1.

By the overall combination of the curved bows 5 and the stepwise arrangement of the lateral rails 13, which are on parallel radii 28, the requirement of the longitudinal and transverse curvature for the sliding and folding liner 1 is satisfied in the same way as the required head clearance 27 from the sliding folding liner 1.

For establishing an intermediate opened/closed position, a marking 44 may be provided on the upper rail 13 to set a stop for a detent position, e.g., in a position with some slides fully to the rear. This avoids the lining material 2 hanging down in an undefined intermediate position.

Lateral masking elements 30 are extruded plastic parts. In FIGS. 10, 10*a*, the masking elements 30 have a U-shaped recess 32 into which the graduated rails 13 are, for instance, pressed, clipped or extruded. To facilitate their mounting and positioning, the masking elements 30 have upper regions at which their locally applied tongues 33 are introduced into the sheet metal pockets 34 formed on the body side. For attachment of the complete masking elements 30, including the rails 13, pot shape elevations 35 are integrated locally on the masking elements 30. They receive known clips 36 which are pushed into corresponding receiving holes 45 in the inner plate of the vehicle body 29. The elevations 35 also bring the masking elements 30 to a necessary distance from the body 29.

As an alternative to the arrangement shown in FIGS. 10, 10*a*, FIG. 11 shows masking elements 30 with the guide grooves 37 for the slides 12 and these are made of an extruded plastic part. The pre-assembly of this part is as indicated above in FIG. 10. However, instead of the clip attachment 36, a screw 38 is provided.

Figure 13:
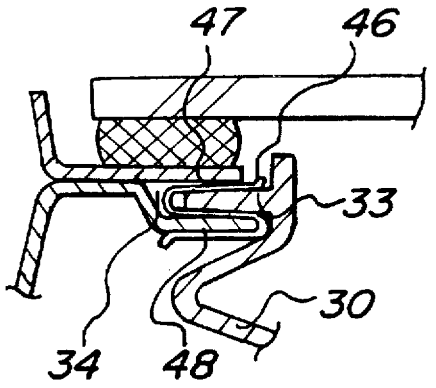
FIG. 13 shows another arrangement for the attachment of a masking element.
Figure 14:
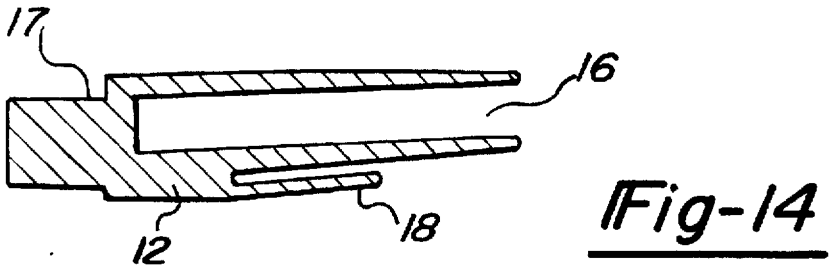
FIG. 14 is a cross section along the line C—C of FIG. 12.
Figure 15:
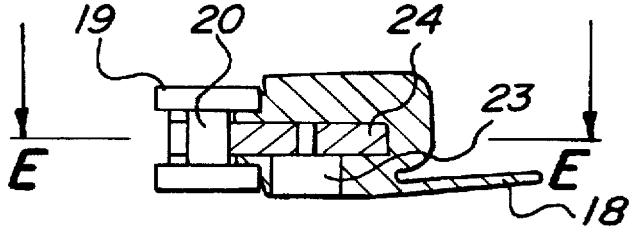
FIG. 15 is a cross section along the line D—D of FIG. 12.
Figure 16:
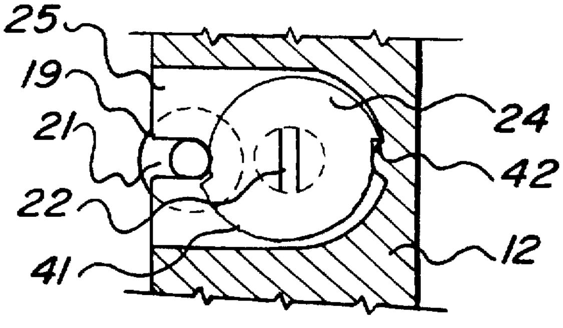
FIG. 16 is a cross section along the line E—E of Fig. 15.

FIG. 13 shows another possible technique for attaching the masking elements 30. Here, a sheet metal claw 46 is pushed onto the plastic tongues 33 with the spread claws 47 hooking. The assembled masking element 30 is then pushed by means of the sheet metal claw 46 into the sheet metal pocket 34. The other spread claws 48 are provided on the body plate for this hook.

Mounting of the complete sliding folding liner 1 is now described. First, the lateral complete masking elements 30 are mounted on the inside of the vehicle. Then, the sliding folding liner 1 is inserted in its folded state, first on one side with the slides 12 into the rail 13 or guide groove 37 (FIG. 11), then the opposite slides 22 are inserted into the rail 13 or groove 37 by slight overpressing or distorting the elastic bows 5. The rear slide 15 forms the frame 11 and fixes the sliding folding liner 1 in place. The liner 1 is inserted, for instance, in the lateral maskings in a pocket-shaped receiver 49 as in FIG. 8.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A roof liner for a motor vehicle comprising:

a lining of generally flexible lining material extending both lengthwise and transversely with reference to the direction of the vehicle, the vehicle having a roof with longitudinal edges, the lining material having a front end toward the front of the vehicle, a rear end toward the rear of the vehicle and lateral sides joining the front and rear ends;

a plurality of bows fastened on the lining material at the front end and the rear end and at a plurality of locations between the front and rear ends, the bows extending to and having opposite ends at the lateral sides of the lining material;

guide elements disposed on the ends of the bows;

guide means for being fastened on the roof of the vehicle at opposite ends of the bows, the guide means extending approximately parallel to the longitudinal edges of the vehicle roof, and the guide means being positioned for receiving the guide elements in a longitudinally displaceable manner in the guide means for enabling the guide elements to move toward the front and rear ends, wherein the bows are uniformly spaced apart and are parallel to each other and to the front and the rear ends of the roof liner; and further comprising at least six bows, the guide elements comprising slides at at least one end of the bows, with a first slide at each end of and rigidly connecting the ends of the first and second bows, a second slide at each end of and rigidly connecting the ends of the third and fourth bows, and a third slide at each end of and rigidly connecting the ends of the fifth and sixth bows, the connections with the bows being spaced apart for tensioning the lining material to define tensioned panels of the lining material between each of the bows connected by one of the slides;

there being no guide elements between the second and third bows and between the fourth and fifth bows, for defining an untensioned panel of the lining material between those bows between which there are no guide elements;

wherein the guide means includes a first guide means, a second guide means, and a third guide means such that there is a respective separate guide means for each of the first, second and third slides.

2. The roof liner of claim 1, wherein the guide means are so shaped and sized that the first slide is movable selectively in a first direction for moving the lining to cover the roof and in a second direction opposite the first direction for stacking one of the slides above the other slide and bringing the tensioned panels into a stack of panels, with the untensioned panel in the stack being between the two adjacent tensioned panels.

3. The roof liner of claim 1, wherein the first guide means is above the second guide means and the second guide means is above the third guide means at the vehicle roof, such that with all of the slides toward the rear end of the lining material, the tensioned panels are vertically stacked one above the other and the untensioned panels are within the stack of tensioned panels.

4. A roof liner for a motor vehicle comprising:

a lining of generally flexible lining material extending both lengthwise and transversely with reference to the direction of the vehicle, the vehicle having a roof with longitudinal edges, the lining material having a front end toward the front of the vehicle, a rear end toward the rear of the vehicle and lateral sides joining the front and rear ends;

a plurality of bows fastened on the lining material at the front end and the rear end and at a plurality of locations between the front and rear ends, the bows extending to and having opposite ends at the lateral sides of the lining material;

guide elements disposed on the ends of the bows;

guide means for being fastened on the roof of the vehicle at opposite ends of the bows, the guide means extending approximately parallel to the longitudinal edges of the vehicle roof, and the guide means being positioned for receiving the guide elements in a longitudinally displaceable manner in the guide means for enabling the guide elements to move toward the front and rear ends;

wherein the bows are uniformly spaced apart and are parallel to each other and to the front and the rear ends of the roof liner;

further comprising at least four bows, the guide elements comprising slides at at least one end of the bows, with a first slide rigidly connecting the ends of the first and second bows and a second slide rigidly connecting the ends of the third and fourth bows, the connections with the bows being spaced apart for tensioning the lining material to define tensioned panels of the lining material between each of the bows connected by one of the slides;

there being no guide element between the second and third bows, whereby an untensioned panel of the lining material is defined between the second and third bows; and wherein the guide means includes a first guide means and a second guide means, the first guide means for the slide of the first and second bows and the second guide means for the slide of the third and fourth bows.

5. The roof liner of a claim 4, wherein the guide means are so shaped and sized that the first slide is movable selectively in a first direction for moving lining to cover the roof and in a second direction opposite the first direction for stacking one of the slides above the other slide and bringing the tensioned panels into a stack of panels, with the untensioned panel in the stack being between the two adjacent tensioned panels.

6. The roof liner of claim 4, wherein each of the guide means comprise rails at opposite sides of the liner, each rail being for slidingly guiding a respective slide at the respective end of a pair of bows, the rails being generally parallel and the rails being in a stack one above the other.

7. The roof liner of claim 6, further comprising a respective masking element at each lateral side of the lining material and shaped and positioned for supporting the rails at that lateral side, the masking elements being attachable to the body of a vehicle.

8. The roof liner of claim 7, wherein the rails are developed as one piece with the masking element which can be fastened to the vehicle body.

9. The roof liner of claim 8, wherein the masking element comprises a plastic extrusion.

10. The roof liner of claim 6, further comprising an actuating handle at that bow that is furthest from the end toward which the bows are moved upon opening the liner.

11. The roof liner of claim 4, wherein the bows divide the lining material into alternate tensioned panels supported between two of the bows which are joined by a slide and untensioned panels which are supported between bows which are not joined by a slide, the tensioned and untensioned panels being arranged alongside one another when the roof liner is stretched over the roof and alternating one above the other when the roof liner is opened and the slides are one above the other.

12. The roof liner of claim 11, wherein one of the slides is furthest toward the rear end of the roof liner and that slide is fixed in place on the vehicle, and there are respective guide means for the others of the slides, and each of the guide means is of a length corresponding to the path of displacement of the respective slide toward the rear end of the roof lining.

13. The roof liner of claim 12, wherein the rails are adapted to the longitudinal curvature of the roof of the vehicle.

14. The roof liner of claim 4, wherein the bows are arcuate in shape to be adapted to the curvature of the roof of the vehicle.

15. The roof liner of claim 14, wherein the bows are non-circular in cross-section.

16. The roof liner of claim 4, further comprising respective loops on the lining material extending across the lining material between the lateral sides thereof shaped for receiving and holding the bows.

17. The roof liner of claim 16, wherein the loops are sewn or welded to the lining material.

18. The roof liner of claim 16, wherein the loops are formed integrally with the lining material at welded seams or sewn seams.

19. The roof liner of claim 4, wherein the slides include sliding means for being guided in the rails.

20. The roof liner of claim 19, wherein the sliding means comprise slide surfaces.

21. The roof liner of claim 19, wherein the sliding means comprise rollers guided on the rails.

22. The roof liner of claim 19, further comprising a displacement device at each of the slides for urging the respective sliding means against the respective rail.

23. The roof liner of claim 22, wherein the displacement device comprises spring urging the sliding means against the rail.

24. The roof liner of claim 22, wherein the displacement device comprises an eccentric disk operable eccentrically to urge the sliding means against the rail.

* * * * *